(12) United States Patent
Schroeder et al.

(10) Patent No.: US 11,695,331 B2
(45) Date of Patent: Jul. 4, 2023

(54) CONVERTER ARRANGEMENT

(71) Applicant: Hitachi Energy Switzerland AG, Baden (CH)

(72) Inventors: Arne Schroeder, Bern (CH); Didier Cottet, Zürich (CH); Wojciech Piasecki, Cracow (PL); Filip Grecki, Rutihof (CH); Bernhard Wunsch, Baden-Dättwil (CH); Torsten Nilsson, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/633,077

(22) PCT Filed: Aug. 5, 2019

(86) PCT No.: PCT/EP2019/071032
§ 371 (c)(1),
(2) Date: Feb. 4, 2022

(87) PCT Pub. No.: WO2021/023369
PCT Pub. Date: Feb. 11, 2021

(65) Prior Publication Data
US 2022/0337154 A1    Oct. 20, 2022

(51) Int. Cl.
*H02M 1/44* (2007.01)
*H02M 7/483* (2007.01)
(Continued)

(52) U.S. Cl.
CPC ............ *H02M 1/44* (2013.01); *H02J 3/01* (2013.01); *H02M 1/0064* (2021.05); *H02M 3/01* (2021.05); *H02M 7/003* (2013.01); *H02M 7/4835* (2021.05)

(58) Field of Classification Search
CPC .......... H02M 1/44; H02M 7/00; H02M 7/483; H02M 7/4835; H02M 1/0064; H02M 3/01; H02M 7/003; H02J 3/01; H02J 3/36
See application file for complete search history.

(56) References Cited

U.S. PATENT DOCUMENTS

2009/0266605 A1   10/2009   Ming et al.
2011/0103115 A1    5/2011   Jacobson et al.
(Continued)

FOREIGN PATENT DOCUMENTS

CN   106547990 A    3/2017
WO   2013075754 A1  5/2013

OTHER PUBLICATIONS

Johansson, K., et al., "Modeling and Measurements of VFT Properties of a Transformer to GIS Bushing", A2_302_2010, CIGRE, Jan. 2010, 11 pages.
(Continued)

*Primary Examiner* — Adolf D Berhane
(74) *Attorney, Agent, or Firm* — Slater Matsil, LLP

(57) ABSTRACT

A converter apparatus includes a string of electrically interconnected modules that includes a first group of modules comprising a first module and a second group of modules comprising a second module. A first screen is connected to a first defined electric potential and is located adjacent the first group of modules and a second screen is connected to a second defined electric potential and is located adjacent the second group of modules. During operation of the converter apparatus a resonance loop is created from the first module via the first and second screens and the second module back to the first module. A damping unit is located in the resonance loop and is set to dampen electromagnetic noise.

20 Claims, 12 Drawing Sheets

(51) Int. Cl.
*H02M 1/00* (2006.01)
*H02M 3/00* (2006.01)
*H02J 3/01* (2006.01)
*H02M 7/00* (2006.01)

(56) References Cited

U.S. PATENT DOCUMENTS

2017/0257022 A1 9/2017 Bryant
2020/0161963 A1* 5/2020 Lefevre .............. H03K 17/6874

OTHER PUBLICATIONS

Abb, Technical Report, "Step and Touch Voltage Safety Report, Dörpen West", Doc. No. 1JNL100155-551 Rev. 01, May 24, 2011, 29 pages.

* cited by examiner

CONVERTER ARRANGEMENT

CROSS-REFERENCE TO RELATED APPLICATIONS

This application is a national stage application of International Application No. PCT/EP2019/071032, filed on Aug. 5, 2019, which application is hereby incorporated herein by reference.

TECHNICAL FIELD

The present invention relates to a converter arrangement comprising at least one string of electrically interconnected modules.

BACKGROUND

Nowadays converter substations for High Voltage Direct Current (HVDC) and Flexible Alternating Current Transmission System (FACTS) applications, are typically based on voltage source converters (VSC) comprising many series connected switching cells. The switching cells, comprising the semiconductor switches can be arranged in so-called PEBBs (power electronic building blocks) or so-called valve structures (also valve towers), typically placed in so-called valve halls. For multiple reasons, PEBBs or cells stacks can be surrounded by electrically conducting structures, connected to the same or similar voltage potential as the switching cells. These surrounding structures have the following possible functions:

In high voltage converters, the surrounding structures act as the electric field-shaping elements or Corona shields. In medium voltage converters, where the field-shaping is less critical, the PEBB enclosures have mainly a mechanical support function.

Resistors have been known to have been connected between valve structures and Corona shields, see for instance WO 2018/177515 and US 2009/0266605, where in both cases their use is linked to Corona discharges.

The switching events of power-semiconductors within the cells generate high frequency currents leading to considerable wideband electromagnetic noise. This noise may propagate out of the valve hall and it may interfere with secondary electronic systems in the vicinity of the substation where it can cause electromagnetic compatibility (EMC) issues.

The electromagnetic noise generated by the switching is typically filtered at system level, by introducing filter circuits in AC- or DC-yards of the substations or by introducing high frequency damping devices in the main converter current paths.

Such Electromagnetic Interference (EMI) filtering components are typically bulky, heavy, expensive, and often require additional space. The components used in such filters are specially designed to comply with given requirements; they are not taken off the shelf. Accordingly, the cost for material and engineering can also be significant.

Damping devices in the main current paths have to be designed to provide high frequency filtering while carrying the full low frequency current. Therefore, the use of magnetic materials needs very careful design and typically large cores in order to avoid saturation under full current load.

There is therefore a need for providing improvements with regard to EMI damping.

SUMMARY

Embodiments of the present invention provide damping of electromagnetic noise in a converter arrangement without the need for additional damping or filtering equipment outside of the converter arrangement.

In a first aspect, a converter arrangement comprises at least one first string of electrically interconnected modules and a first and a second screen. The first screen is connected to a first defined electric potential and is placed adjacent a first group of modules in the first string comprising at least one first module and the second screen is connected to a second defined electric potential and is placed adjacent a second group of modules in the first string comprising at least one second module. In operation of the converter arrangement a resonance loop is created from the first module via the first and second screens and the second module back to the first module and the converter arrangement further comprises a damping unit in the resonance loop set to dampen electromagnetic noise.

Embodiments of the invention have a number of advantages. It dampens the high frequency currents and thus reduces the EMI without the need for external filters and damping circuits. Moreover, the damping unit may in many instances be placed in already exiting spaces in the converter arrangement and therefore the size of the converter arrangement may be retained or only slightly increased. The damping unit may additionally be realized in a simple and economical way. The damping unit is not placed in the main current path and does therefore not need to be dimensioned for high current carrying capabilities, such as low joule heating, no magnetic saturation, etc.

BRIEF DESCRIPTION OF THE DRAWINGS

The present invention will in the following be described with reference being made to the accompanying drawings, where FIG. 1 schematically shows a phase leg of a first variation of a first type of converter arrangement and a resonance loop appearing in it, FIG. 2 schematically shows a phase leg of a first variation of a second type of converter arrangement and a resonance loop appearing in it, FIG. 3 schematically shows resonance loops occurring in a second variation of the first type of converter arrangement having parallel stacks of cells, FIG. 4 schematically shows resonance loops occurring in a second variation of the second type of converter arrangement having a string of cells arranged in a zig-zag configuration, FIG. 5 schematically shows a first type of damping unit connected in the first variation of the first type of converter arrangement for providing EMI filtering.

DETAILED DESCRIPTION OF ILLUSTRATIVE EMBODIMENTS

Figure 1:
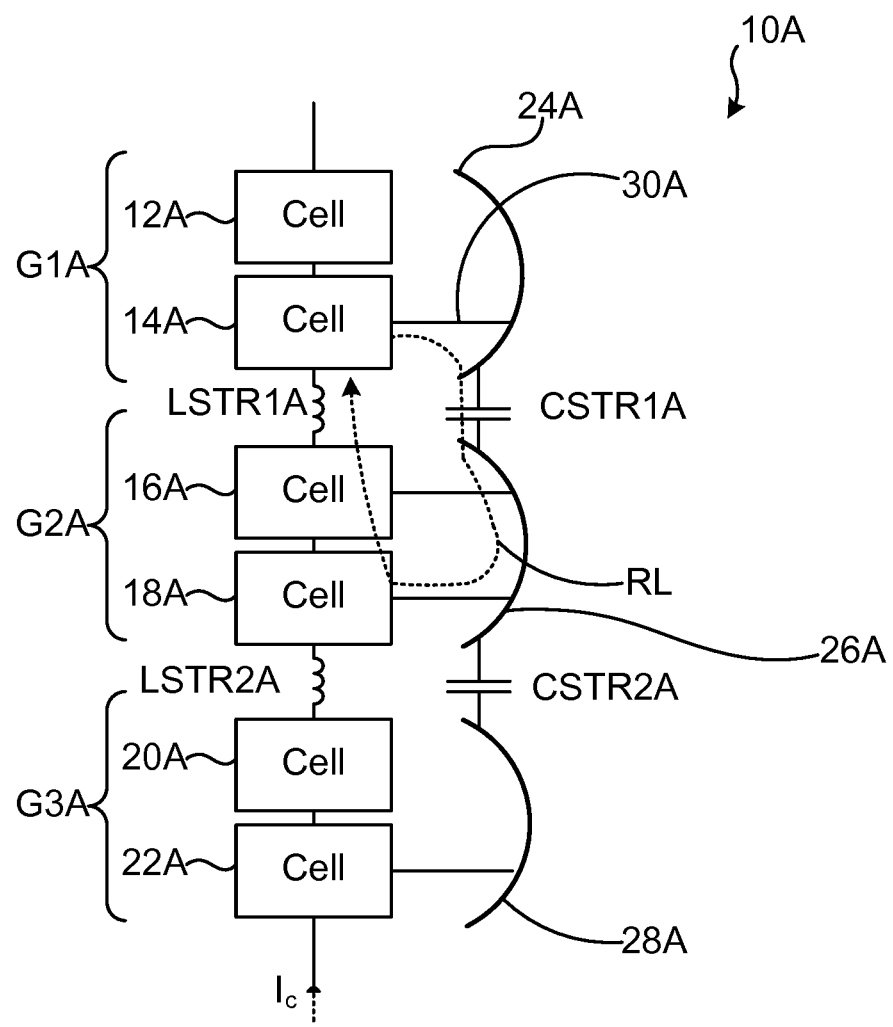

The present invention concerns a converter arrangement that may be a converter arrangement in high power applications. The converter arrangement may comprise a High Voltage Direct Current (HVDC) converter operating at a high voltage such as at 80 kV and above. The converter arrangement may furthermore be enclosed in an enclosure such as a valve hall that has a different electric potential than the different individual components of the converter arrangement. It is for instance possible that the enclosure is grounded while the converter arrangement operates at a voltage level of +1500 kV or −1500 kV or some high voltage therebetween. Other feasible voltage levels are ±800 kV. The converter arrangement may for instance be a converter, converting between Alternating Current (AC) and Direct Current (DC), such as a voltage source converter (VSC). Moreover, a voltage source converter may be provided as a modular multilevel converter (MMC), where a number of cascaded converter submodules or cells are used for forming an AC wave shape, where a cell comprises switches and capacitors. These cells may be connected in three parallel phase legs that stretch between two DC poles or between one DC pole and ground, where the midpoints of the phase legs are connected to corresponding AC phases. This type of converter arrangement is a first type of converter arrangement.

As an alternative a converter arrangement may comprise a number of phase legs that are delta- or star-connected between the phases of an AC system. This type of converter arrangement is a second type of converter arrangement that may be provided for reactive power compensation purposes. Also, this second type of converter arrangement comprises cells or submodules comprising switches and capacitors, where the cells may be provided in so-called power electronic building blocks (PEBBs). A cell is more particularly a module comprising components including switches and at least one capacitor.

Embodiments will be discussed here. Specific examples will then be described with respect to the drawings.

In one embodiment, a converter apparatus comprises a first string of electrically interconnected modules that includes a first group of modules comprising a first module and a second group of modules comprising a second module. A first screen is connected to a first defined electric potential and is located adjacent the first group of modules and a second screen is connected to a second defined electric potential and is located adjacent the second group of modules. During operation of the converter apparatus a resonance loop is created from the first module via the first and second screens and the second module back to the first module. A damping unit is located in the resonance loop and is set to dampen electromagnetic noise.

Each module comprises components including switches and at least one capacitor. The first defined potential may additionally be provided through a first electrical connection between the first module and the first screen and the second defined potential may be provided through a second electrical connection between the second module and the second screen. The first and second screens may additionally be placed adjacent to each other and separated by a gap that defines a stray capacitance between them.

It is evident that resonance loops comprise stray capacitances and stray inductances. The damping unit may therefore dampen the electromagnetic noise in the range 9 kHz-6 GHz, for instance by means of filtering. The damping unit may because of this be set to dampen or filter the electromagnetic noise at frequencies defined by the stray capacitances and stray inductances of the resonance loop.

According to a first variation, the damping unit may be a first damping unit placed between the module of the group that provides the defined potential and the screen for which the potential is provided.

It is possible that the group of modules is the first group of modules and the screen is the first screen. The first damping unit may in this case be placed or connected in the first electrical connection between the first module and the first screen. It is in a similar way possible also with a damping unit placed in the second electrical connection between the second module and the second screen.

According to a second variation, the damping unit is placed between the first and second screens. The damping unit may more particularly be connected between the first and second screens.

With the damping unit placement according to the first variation, it is possible to realize the first damping unit using a core of magnetic material surrounding the electrical connection between a module providing a defined potential and the screen that is to receive this defined potential, i.e., to the screen for which the potential is provided. It is additionally possible that this damping unit comprises a coil wound around the core of magnetic material and possibly also a resistor connected to the coil.

With the damping unit placement according to the first variation, the damping unit may comprise a filtering component in the form of an inductor.

With the damping unit placement according to the second variation, the damping unit may comprise a filtering component in the form of a capacitor.

The damping unit according to both variations may in fact comprise a resistance. The resistance may be the only element of the damping unit. As an alternative the damping unit may comprise an inductor and/or a capacitor. In such a case the damping unit may be a filter comprising a resistance and another filter component, where the resistance may be implemented using a first filter component and the other filter component, that is either the previously mentioned inductor or the previously mentioned capacitor, may be a second filter component.

The first filter component may be connected in parallel with the second filter component in case the second filter component is an inductor. This is especially the case in the first variation. The first filter component may be connected in series with the second filter component in case the second filter component is a capacitor. This is especially the case in the second variation.

It is additionally possible with at least one further filter component in the damping unit for providing enhanced filtering such as band-pass and band-stop filtering. A filter may thus comprise a plurality of components for obtaining a desired filtering functionality.

The screen is typically conductive and may as an example be made of aluminum or copper. In this case the resistance of the damping unit may be realized as a component, i.e. as a resistor. However, as an alternative the resistance of the damping unit may be realized through the screen being semiconductive. The screen may as an example be realized using a composite, such as a thermoplastic or thermosetting material, comprising a conductive filler such as carbon clack. It may also be made of a non-conductive material having a resistive coating, in which case the electrical connection is made to the coating layer.

The first string may comprise a first and a second electrically interconnected and horizontally aligned stack placed in parallel with each other, where the first and second groups of modules are included in the first and second stack, respectively. It is additionally possible that the first and second groups of modules are vertically aligned with each other.

The converter arrangement may be configured to convert between alternating current (AC) and direct current (DC). In this case the converter arrangement may comprise three strings of modules in three phase legs connected between two poles or between a pole and ground, with the midpoints connected to the phases of a three-phase AC system. The modules may in this case be cells or submodules. In this case the first and second screens may be corona shields provided for neighboring groups of modules in the first string, where the first and second groups of modules are two such neighboring groups.

As another example, the converter arrangement may be provided for reactive power compensation in an AC system. Because of this the converter arrangement may comprise three strings or phase legs between the phases of the AC system. The strings may be delta- or star-connected between the phases. In this case the modules may be power electronic building blocks (PEBBs). In this converter arrangement, the first and second screens are enclosures for neighboring first and second groups of modules. A screen may in this case be the enclosure or frame of a PEBB comprising a group of modules in the form of cells or submodules.

FIG. 1 schematically shows a string in a phase leg of a first variation of the first type of converter arrangement 10A, in which string a number of cells are connected in cascade. There is here from top to bottom a first cell 12A, a second cell 14A, a third cell 16A, a fourth cell 18A, a fifth cell 20A and a sixth cell 22A, where the first and second cells 12A and 14A together form a first group of cells G1A, the third and fourth cells 16A and 18A together form a second group of cells G2A and the fifth and sixth cells 20A and 22A together form a third group of cells G3A. It should be realized that the number of cells in a group may be more, but also fewer.

In order to protect the cells or rather the components of the cells of the different groups from Corona discharges, the first group of cells G1A are connected to a first Corona shield 24A, the second group of cells G2A is connected to a second Corona shield 26A and the third group of cells G3A is connected to a third Corona shield 28A. The first Corona shield 24A is more particularly placed adjacent the first group of cells G1A, the second Corona shield 26A is placed adjacent the second group of cells G2A and the third Corona shield 28A is placed adjacent the third group of cells G3A. A Corona shield is here also a screen, typically made of a conductive material such as Copper or Aluminum. The protection is here typically the protection from Corona discharges from the environment such as the walls of the valve hall, which walls may be kept at ground potential.

The Corona shields are placed at defined electric potentials. As an example, the second cell 14A in the first group of cells G1A here has a first electrical connection 30A to the first Corona shield 24A in order to provide the first Corona shield 24A with a first defined electric potential, the fourth cell 18A of the second group of cells G2A has a second electrical connection to the second Corona shield 26A in order to provide the second Corona shield 26A with a second defined electric potential, while the sixth cell 22A of the third group G3A has a third electrical connection to the third Corona shield 28A in order to provide the third Corona shield 28A with a third defined electric potential. The defined electric potential may in this case be a potential or local ground of the particular cell in the string. The potential may thereby differ from cell to cell. It should be realized that it is possible that another cell in the group provides the defined potential to a Corona shield instead of the described second, fourth and sixth cells 14A, 18A and 22A.

Figure 2:
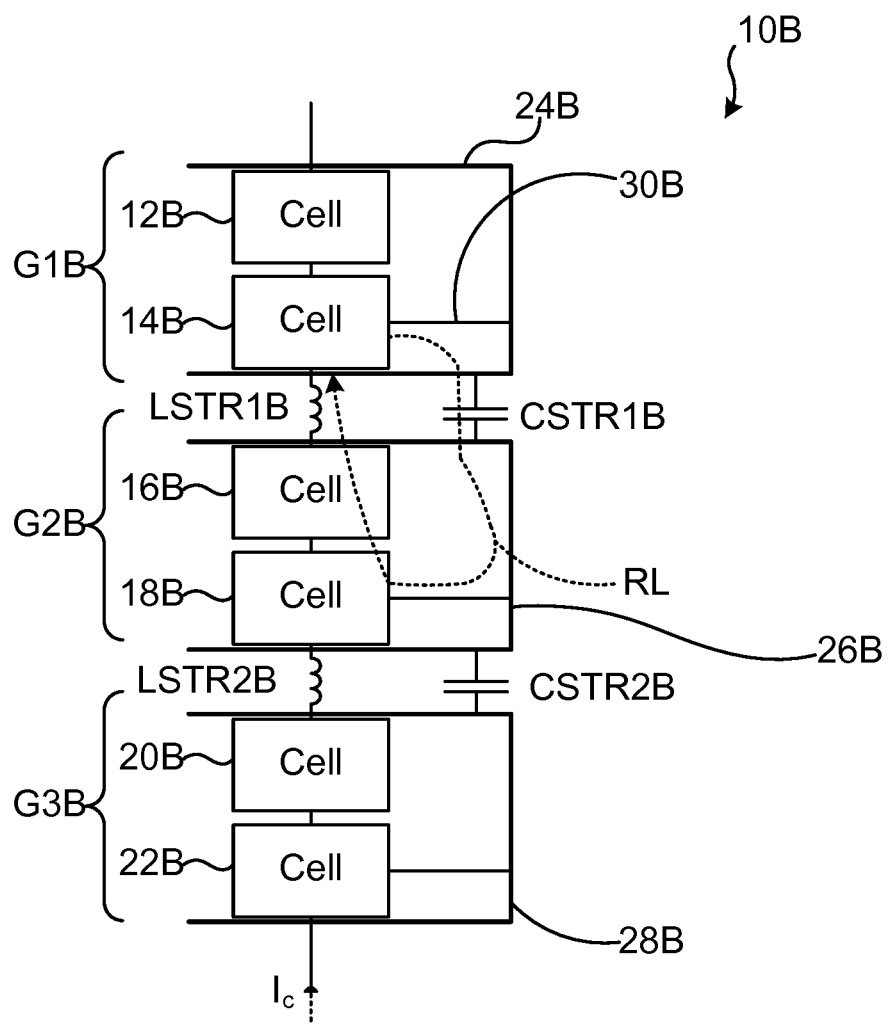

In a similar manner FIG. 2 schematically shows a string in a phase leg in a first variation of the second type of converter arrangement 10B, where a number of cells are connected in cascade. There is here from top to bottom a first cell 12B, a second cell 14B, a third cell 16B, a fourth cell 18B, a fifth cell 20B and a sixth cell 22B, where the first and second cells 12B and 14B together form a first group of cells G1B, the third and fourth cells 16B and 18B together form a second group of cells G2B and the fifth and sixth cells 20B and 22B together form a third group of cells G3B.

In this second type of converter arrangement 10B, the first and second cells 12B and 14B are enclosed in an enclosure in the form of a first PEBB frame 24B, the third and fourth cells 16B and 18B are enclosed in an enclosure in the form of the second PEBB frame 26B and the fifth and sixth cells 20B and 22B are enclosed in an enclosure in the form a third PEBB frame 28B. The first PEBB frame 24B is thereby placed adjacent and in this case also encloses the first group of cells G1B, the second PEBB frame 26B is placed adjacent and in this case also encloses the second group of cells G2B and the third PEBB frame 28B is placed adjacent and in this case also encloses the third group of cells G3B. A PEBB frame is also a screen, typically made of a conductive material such as Copper or Aluminum.

The second cell 14B in the first group of cells G1B here has a first electric connection 30B to the first PEBB frame 24B in order to provide the first PEBB frame 24B with a first defined electric potential, the fourth cell 18B of the second group of cells G2B has a second electric connection to the second PEBB frame 26B in order to provide the second PEBB frame 26B with a s second defined electric potential, while the sixth cell 22B of the third group of cells G3B has a third electric connection to the third PEBB frame 28B in order to provide the third PEBB frame 28B with a third defined electric potential. One of these potentials may in this case be ground potential. It is also here possible that another cell in the group provides the PEBB frame with a defined potential.

Figure 3:
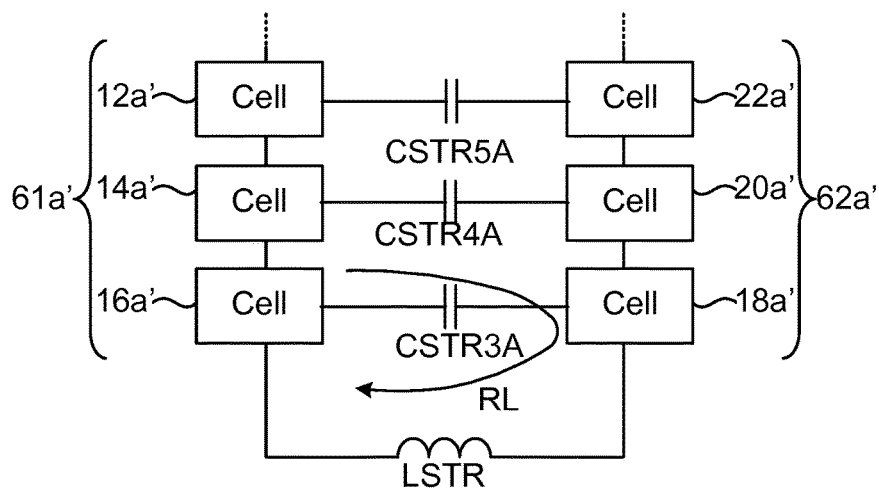

FIG. 3 shows a second variation 1A' of the first type of converter arrangement. The string of cells of a phase leg may be placed in two parallel vertical stacks. The previously discussed first, second and third cells 12A', 4A' and 16A' may then be placed in a first stack, while the fourth, fifth and sixth cells 18A', 20A' and 22A' may be placed in a second stack. The first, second and third cells 12A', 4A' and 16A' may in this case be a first group of cells G1A', while the fourth, fifth and sixth cells 18A', 20A' and 22A' may form a second group of cells G2A'. The stacks are thus vertically oriented and parallel with each other. The cells may additionally be horizontally aligned. As can be seen in FIG. 3 the third cell 16A' may be horizontally aligned with the fourth cell 18A', the second cell 14A' may be horizontally aligned with the fifth cell 20A' and the first cell 12A' may be horizontally aligned with the sixth cell 22A'.

Figure 4:
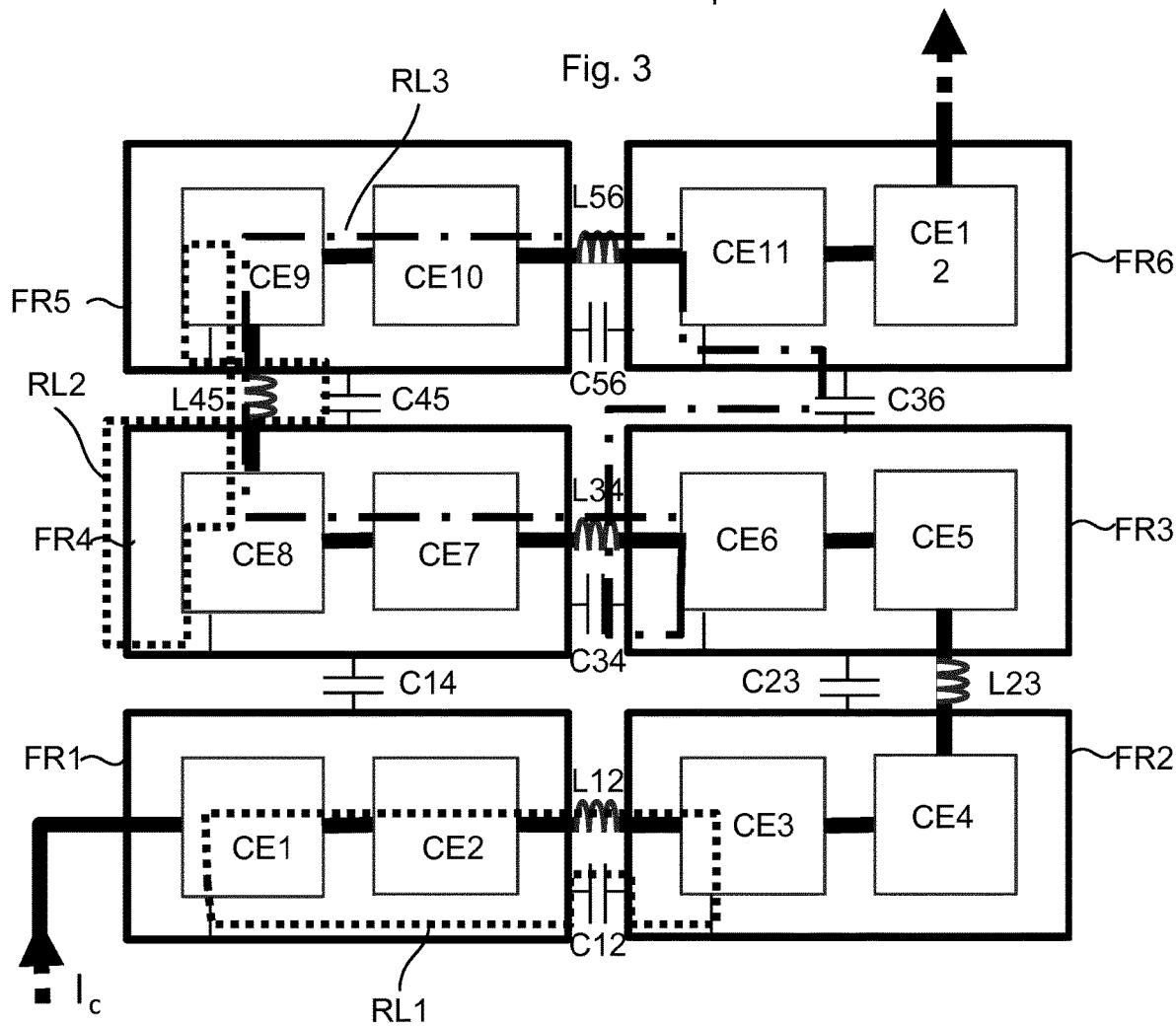

FIG. 4 shows a second variation of the second type of converter arrangement. In this case the first string comprises a first, second, third, fourth, fifth, sixth, seventh, eighth, ninth, tenth, eleventh and twelfth cell CE1, CE2, CE3, CE4, CE5, CE6, CE7, CE8, CE9, CE10, CE11 and CE12 connected in series with each other. The first and second cells CE1 and CE2 are enclosed in a first PEBB frame FR1, the third and fourth cells CE3 and CE4 are enclosed in a second PEBB frame FR2, the fifth and sixth cells CE5 and CE6 are enclosed in a third PEBB frame FR3, the seventh and eighth cells CE7 and CE8 are enclosed in a fourth PEBB frame FR4, the ninth and tenth cells CE9 and CE10 are enclosed in a fifth PEBB frame FR5 and the eleventh and twelfth cells CE11 and CE12 are enclosed in a sixth PEBB frame FR6. The first cell CE1 here has a first electric connection to the first PEBB frame FR1, the third cell CE3 has a second electric connection to the second PEBB frame FR2, the sixth cell CE6 has a third electric connection to the third PEBB frame FR3, the eighth cell CE8 has a fourth electric connection to the fourth PEBB frame FR4, the ninth cell CE9 has a fifth electric connection to the fifth PEBB frame FR5 and the eleventh cell CE11 has a sixth electric connection to the sixth PEBB frame FR6. The string has meandering or zig-zag configuration, which in this case means that the first and second frames FR1 and FR2 are in a first stack, the third and fourth frames are in a second stack FR3 and FR4 and the fifth and sixth frames FR5 and FR6 are in a third stack, which stacks are parallel with each other. Thereby the first frame FR1 is placed adjacent the second and fourth frames FR2 and FR4, the second frame FR2 is placed adjacent the first and third frames FR1 and FR3, the third frame FR3 is placed adjacent the second, fourth and sixth frames FR2, FR4 and FR6 and the fourth frame FR4 is placed adjacent the first, third and fifth frames FR1, FR3 and FR5. As a consequence, it is thereby also clear that the fifth frame FR5 is placed adjacent the fourth and sixth frames FR4 and FR6 and the sixth frame FR6 is placed adjacent the third and fifth frames FR3 and FR5.

In use the above-mentioned converter arrangements generate electromagnetic noise that has to be removed in order to fulfill various electromagnetic interference (EMI) requirements. This EMI has traditionally been filtered at system level, by introducing filter circuits in an AC- or DC-yard connected to the converter arrangement or by introducing high frequency damping devices in the main converter current paths.

Such EMI filtering components are typically bulky, heavy, expensive, and often require additional space. Moreover, such filters are specially designed to comply with given requirements; they are not taken off the shelf. Accordingly, the cost for material and engineering can be significant.

Damping devices in the main current paths have to be designed to provide high frequency filtering while carrying the full low frequency current. Therefore, the use of magnetic materials needs very careful design and typically large cores in order to avoid saturation under full current load.

There is therefore a need for less bulky and simple way of realizing EMI damping.

The inventors have realized that one main cause of the EMI in a converter arrangement are resonance loops formed through stray inductances and stray capacitances.

There will be stray capacitances between the shields and PEBB elements as well as stray inductances between the cells in the phase legs. In FIG. 1 and FIG. 2 it can therefore be seen that a first stray capacitance $C_{STR1A}$ occurs between the first and second Corona shields 24A and 26A and a first stray capacitance $C_{SRTR1B}$ occurs between the first and second PEBB frames 24B and 26B. There is also a second stray capacitance $C_{STR2A}$ between the second and third Corona shields 26A and 28A as well as a second stray capacitance $C_{SRTR1B}$ between the second and third PEBB frames 26B and 28B. As the Corona shields and PEBB frames are screens, it can thus be seen that the first and second screens are placed adjacent each other and separated by a gap that defines a stray capacitance between them and that the second and third screens are placed adjacent each other and separated by a gap that defines a stray capacitance between them. There is also a first stray inductance $L_{STR1A}$ between the first and second groups of cells G1A and G2A as well as a first stray inductance $L_{STR1B}$ between the first and second groups of cells G1B and G2B. There is also a second stray inductance $L_{STR2A}$ between the second and third groups of cells G2A and G3A as well as a second stray inductance $L_{STR2B}$ between the second and third groups of cells G2B and G3B.

In FIG. 3 it can be seen that stray capacitances exist between the vertically aligned cells in the two stacks. There is thus a third stray capacitance $C_{STR3A}$ between the third and fourth cells 16A' and 18A', a fourth stray capacitance $C_{STR4A}$ between the second and fifth cells 14A' and 20A' and a fifth stray capacitance $C_{STR5A}$ between the first and sixth cells 12A' and 22A'. There is also a stray inductance $L_{STR}$ between the two stacks.

In FIG. 4 it can be seen that there exists stray capacitances between the frames that are placed adjacent each other. There is thus a stray capacitance $C_{12}$ between the first and second frames FR1 and FR2, a stray capacitance $C_{14}$ between the first and fourth frames FR1 and FR4, a stray capacitance $C_{23}$ between the second and third frames FR2 and FR3, a stray capacitance $C_{34}$ between the third and fourth frame FR3 and FR4, a stray capacitance $C_{36}$ between the third and sixth frame FR3 and FR6, a stray capacitance $C_{45}$ between the fourth and fifth frame FR4 and FR5 and a stray capacitance $C_{56}$ between the fifth and sixth frame FR5 and FR6.

There are also stray inductances in the electrical paths between the frames. There is thus a stray inductance $L_{12}$ between the first and second frames FR1 and FR2, a stray inductance $L_{23}$ between the second and third frames FR2 and FR3, a stray inductance $L_{34}$ between the third and fourth frame FR3 and FR4, a stray inductance $L_{45}$ between the fourth and fifth frame FR4 and FR5 and a stray inductance $L_{56}$ between the fifth and sixth frame FR5 and FR6.

As can be seen above, the surrounding structures of the PEBBs or valve cells can be quite large. Thereby the stray capacitances may be large. In combination with the cell stray inductances, i.e. the stray inductances in the string, the stray capacitances can form LC resonant circuits causing high peaks in the EMC-critical frequency range which can propagate to the outside of the station and radiate. Possible propagation paths include capacitive coupling to ground, inductive coupling to busbars etc.

As an example of this and as can be seen in FIG. 1 there is formed a first resonance loop RL from the second cell 14A via the first connection 30A, the first Corona shield 24, the second Corona shield 26A, the fourth cell 18A and the third cell 16A back to the second cell 14A, which first loop RL comprises the first stray capacitance CSTR1A and the first stray inductance LSTR1A. As was mentioned above the cells are modules. Because of this a group of cells is also a group of modules. The second cell 14A is here a first module of the first group of modules in the first resonance loop RL, while the fourth cell 18A is a second module of the second group of modules in the resonance loop RL. Thereby the first resonance loop RL is also a loop stretching from the first module via the first and second screens and the second module back to the first module. The loop RL also passes any module electrically connected in-between the first and second modules, which in this case is the module implemented through the third cell 16A.

It can in a similar manner be seen in FIG. 2 that a first resonance loop RL is formed from the second cell 14B via the first connection 30B, the first PEBB frame 24B, the second PEBB frame 26B, the fourth cell 18B and the third cell 16B back to the second cell 14B, which first loop RL likewise comprises the first stray capacitance CSTR1B and the first stray inductance LSTR2B. In this case the second cell 14B is also a first module of the first group of modules in the first resonance loop RL and the fourth cell 18B is a second module of the second group of modules in the resonance loop RL, where, as can be seen in FIG. 2, the first resonance loop RL is a loop stretching from the first module via the first and second screens and the second module back to the first module. Also, in this case the loop RL also passes any module in-between the first and second modules, which in this case is the module implemented through the third cell 16B.

FIG. 3 in turn shows a number or of resonance loops between the vertically aligned stacks of cells passing the stray capacitances and the stray inductance LSTR. In this case the third cell 16A' may be seen as a first module of the first group of modules in a first resonance loop and the fourth cell 18A' may be seen as a second module of the second group of modules in the first resonance loop. The third cell 16A' may be seen as a first module of the first group of modules in a second resonance loop and the fifth cell 20A' may be seen as a second module of the second group of modules in the second resonance loop. Finally, the first cell 12A' may be seen as a first module of the first group of modules in a third resonance loop and the sixth cell 22A' may be seen as a second module of the second group of modules in the third resonance loop. Also, in this case each loop passes the component of any module in-between the first and second modules as well as comprises the stray inductance LSTR. These parallel loops may also be considered as one resonance loop RL'.

There are also multiple resonance loops in FIG. 4. There is a first resonance loop RL1 from the first cell CE1 via the first electrical connection to the first frame FR1, from the first frame FR1 to the second frame FR2 via capacitance C12, from the second frame F2 to the third cell CE3 via the second electrical connection and from the third cell CE3 back to the first cell CE1 via the inductance L12 and the second cell C2. There is a second resonance loop RL2 from the eighth cell CE8 via the fourth electrical connection to the fourth frame FR4, from the fourth frame FR4 to the fifth frame FR5 via capacitance C45, from the fifth frame FR5 via the fifth electrical connection to the ninth cell CE9 and from the ninth cell CE9 back to the eight cell CE8 via the inductance L45. There is finally a third resonance loop RL3 from the sixth cell CE6 via the third electrical connection to the third frame FR3, from the third frame FR3 to the sixth frame FR6 via capacitance C36, from the sixth frame FR6 to the eleventh cell CE11 via the sixth electrical connection, from the eleventh cell CE11 to the tenth cell via inductance L56 and from the tenth cell CE10 back to the sixth cell CE6 via the ninth cell CE9, inductance 145, the eight cell CE8, the seventh cell CE7 and inductance L34.

As can be seen in FIG. 4, a resonance loop may comprise the cells of more than two frames. There may thus be cells in frames in-between the two frames between which the resonance loop passes via a stray capacitance. Three may thus be more modules than the first and second modules of a resonance loop, where these additional modules would be connected between the first and second modules.

Aspects of the invention are directed towards placing local damping units in the above-described LC loops for obtaining an EMI reduction. Thereby the individual damping units may be made smaller than if central damping and/or filtering is used. They may also be placed at locations that are needed anyway for other purposes. A Corona screen may for instance need a certain space from the group of cells it protects. If a damping unit is placed in this space, the volume of the converter arrangement remains unchanged with the addition of the damping unit. A damping unit may thereby not increase the bulkiness of a converter arrangement. A damping unit may also have a simpler realization. In some instances a damping unit may be realized merely using a suitably dimensioned resistor.

Aspects of the present disclosure are therefore directed towards introducing a damping unit or dissipating element in the resonance loop to damp the resonance peaks. The filtering or damping may be made in the frequency range of 9 kHz-6 GHz, with advantage in the frequency range 9 kHz-2 GHz, preferably in the frequency range 9 kHz-1 GHz and more preferably in the frequency range of 9 kHz-30 MHz.

This can be achieved by several measures which shall be discussed in the following.

Figure 5:
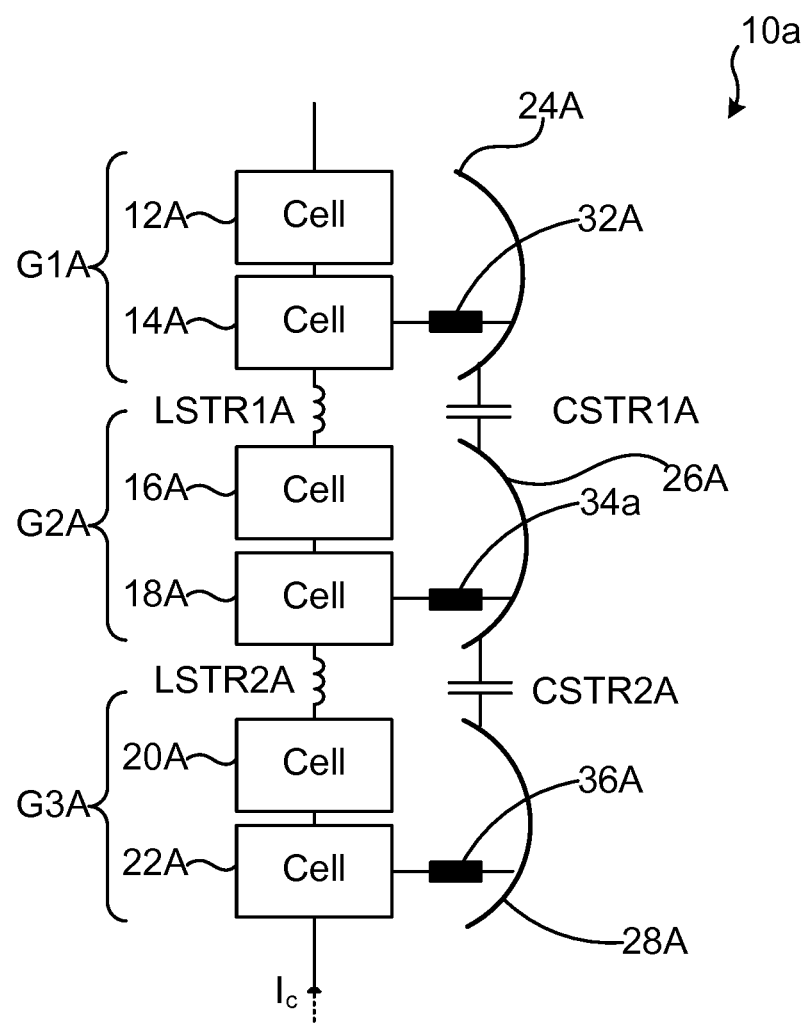

As can be seen in FIG. 5 in the first variation of the first type of converter arrangement 10A, the damping is achieved by implementing a first damping unit 32A in the first resonance loop RL, ideally at the well-defined location where the cells are connected to the Corona shield. A damping unit may thus be placed in the first electric connection used for providing the defined potential of the first Corona shield 24A, which in this example is the first electrical connection 30A between the second cell 14A and the first Corona shield 24A. This first damping unit 32A is connected in series with the stray capacitances CSTR1A and stray inductances LSTRIA in the first resonance loop RL and dampens resonances in this first resonance loop RL formed by the second, third and fourth cells 14A, 16A, 18A together with the first stray inductance LSTR1A and first stray capacitance CSTR1A. Similar damping units 34A and 36A may be connected between the fourth cell 18A and the second Corona shield 26A and between the sixth cell 22A and the third Corona shield 28A, i.e. in the connection between a cell and the corresponding Corona shield providing the defined potential of the Corona shield. The damping units are all of a first type.

Figure 6:
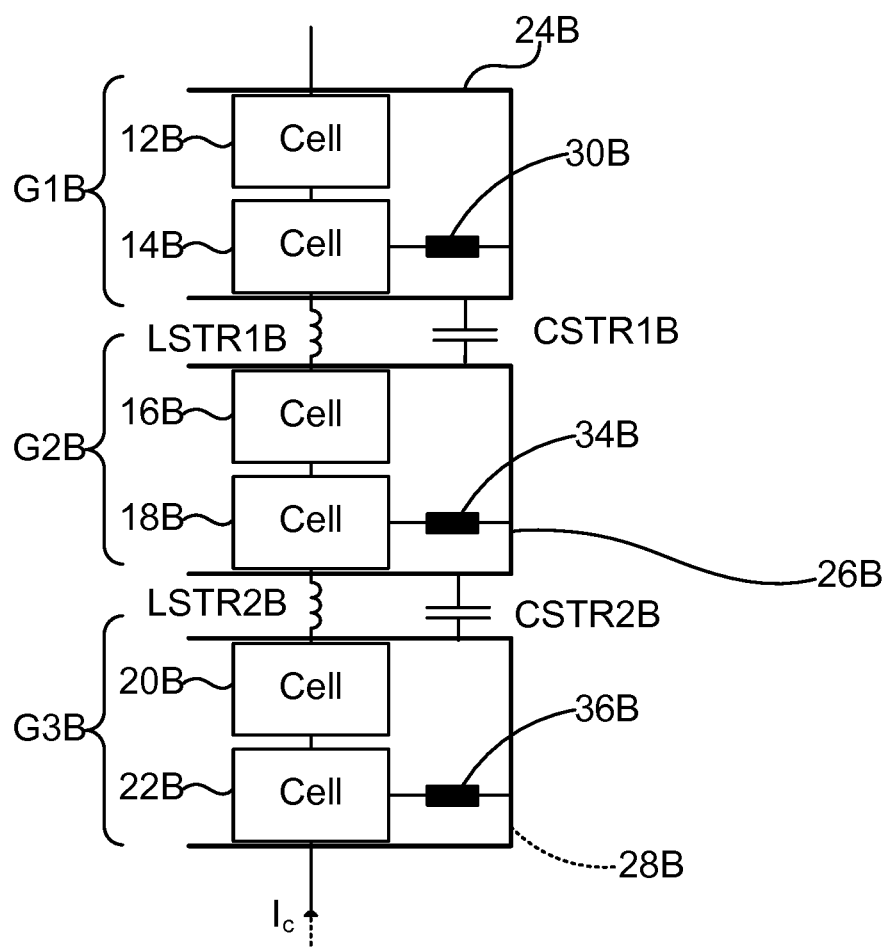
FIG. 6 shows the first type of damping unit connected in the first variation of the second type of converter arrangement for providing EMI filtering.

As can be seen in FIG. 6 in the first variation of the second type of converter arrangement 10B, the damping is achieved by implementing a first damping unit 32B in series in the loop RL, ideally at the well-defined location where a cell is connected to a PEBB frame. A first damping unit 32B may thus be placed in the first electrical connection 30B between the second cell 14B and the first PEBB frame 24B in order to dampen resonances in the first resonance loop RL formed by the second, third and fourth cells 14B, 16B, 18B and the first stray inductance LSTR1B and first stray capacitance CSTR1B. Similar damping units 34B and 36B may be connected between the fourth cell 18B and the second PEBB frame 26B and between the sixth cell 22B and the third PEBB frame 28B. All these damping units are of the first type.

Figure 7:
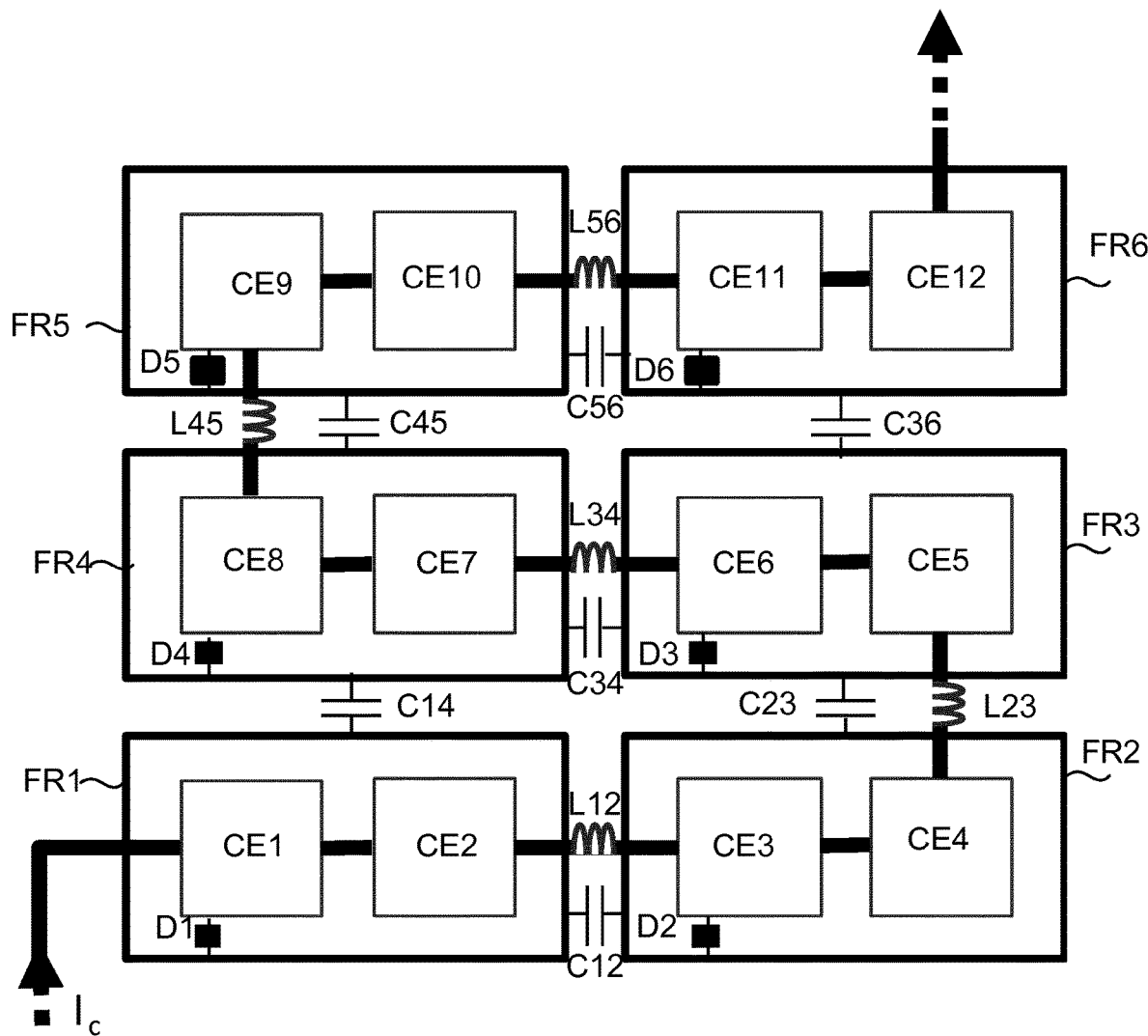
FIG. 7 shows the first type of damping unit connected in the second variation of the second type of converter arrangement.

As can be seen in FIG. 7, it is in the same way possible to connect damping units of the first type in the connections between cells and the frames in the second variation of the second type of converter. The first electric connection between first cell CE1 and the first frame FR1 thus comprises a damping unit D1, the second electric connection between third cell CE3 and the second frame FR2 comprises a damping unit D2, the third electric connection between sixth cell CE6 and the third frame FR3 comprises a damping unit D3, the fourth electric connection between the eighth cell CE8 and the fourth frame FR4 comprises a damping unit D4, the fifth electric connection between the ninth cell CE9 and the fifth frame FR5 comprises a damping unit D5 and the sixth electric connection between the eleventh cell CE11 and the sixth frame FR6 comprises a damping unit D6, where all damping units are of the first type.

Figure 12A:
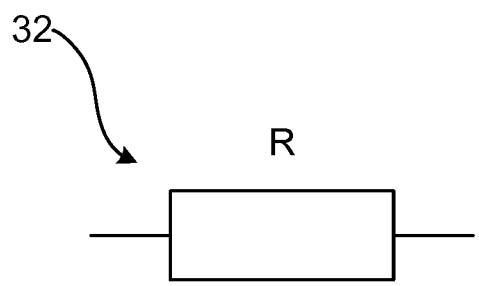
FIG. 12a shows a first realization of the first type of damping unit.
Figure 12B:
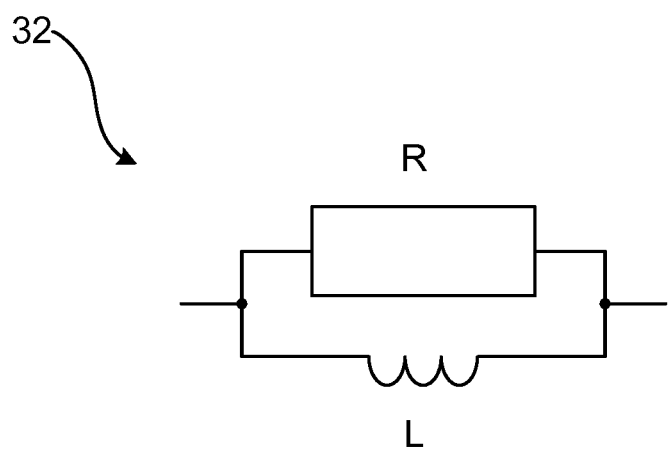
FIG. 12b shows a second realization of the first type of damping unit.

The first type of damping unit may be realized as a resistor R, as is shown in FIG. 12a or as a resistor R in parallel with an inductance L, as can be seen in FIG. 12b, in which latter case the first type of damping unit may in fact be a first filter.

Figure 8:
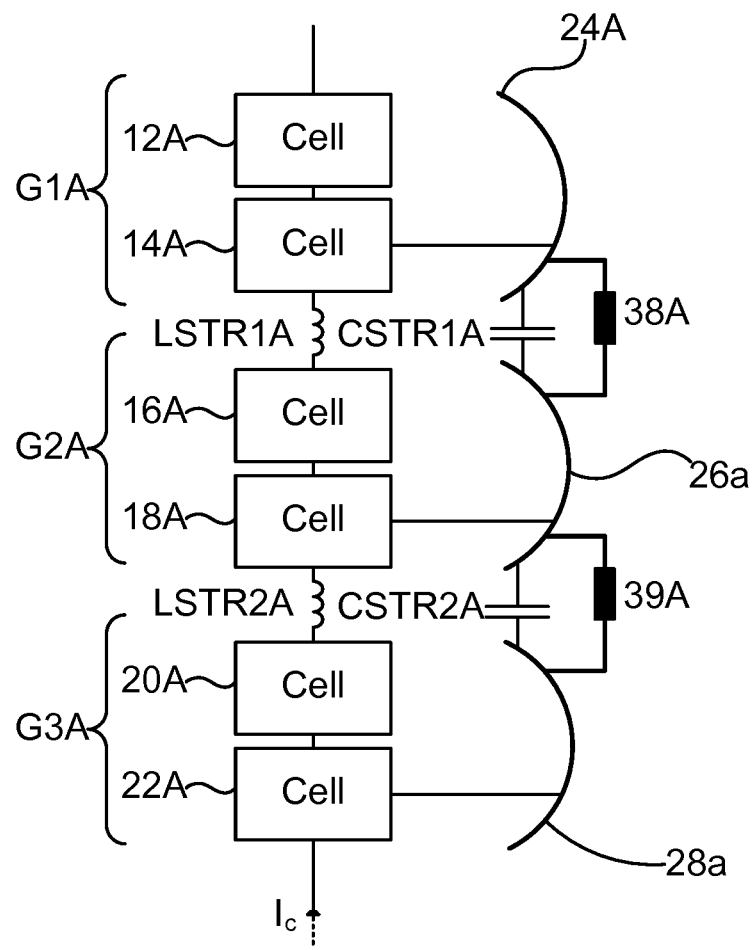
FIG. 8 shows a second type of damping unit connected in the first variation of the first type of converter arrangement for providing EMI filtering.

Another possible placement of a damping unit is in parallel with a stray capacitance of a resonance loop. As can be seen in FIG. 8 that discloses the first variation of the first type of converter arrangement, it is possible to connect a second damping unit 38A between the first and second Corona shields 24A and 26A, which is in effect in parallel with the first stray capacitance CSTR1A. A further damping unit 39A may in a similar manner be connected between the second and third Corona shields 26A and 28A, i.e. in effect in parallel with the second stray capacitance CSTR2A. Both the damping units are in this case of a second type.

Figure 9:
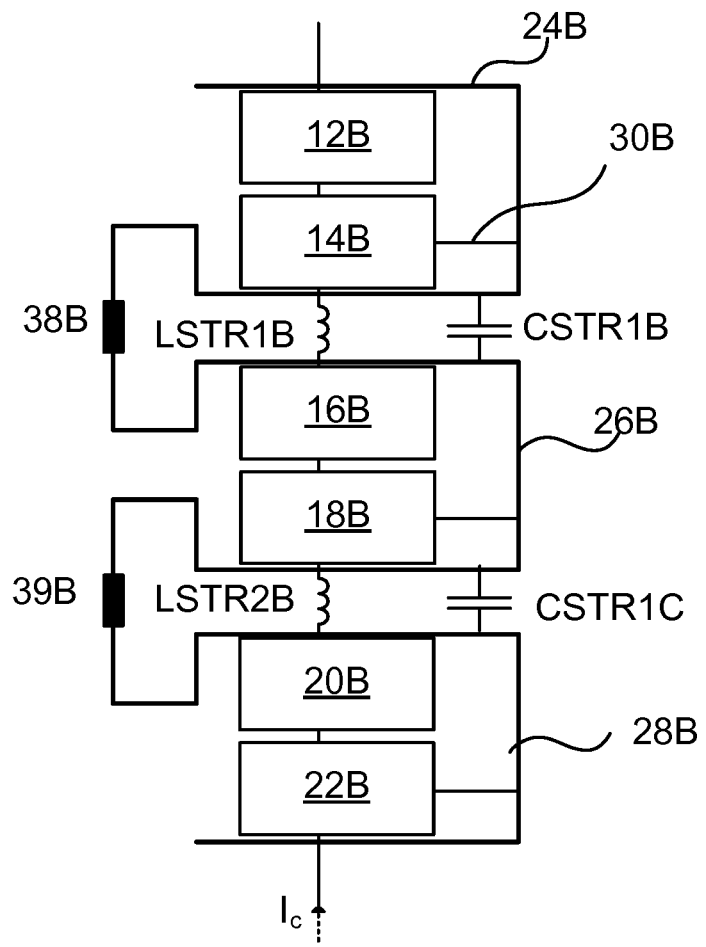
FIG. 9 shows the second type of damping unit connected in the first variation of the second type of converter arrangement for providing EMI filtering.

As can be seen in FIG. 9, this approach may also be applied in the first variation of the second type of converter arrangement. A second damping unit 38B may thus be connected between the first and second PEBB frames 24B and 26B, which is in effect in parallel with the first stray capacitance CSTR1B. A further damping unit 39B may in a similar manner be connected between the second and third PEBB frames 26B and 28B, i.e. in effect in parallel with the second stray capacitance CSTR2B. Both of the damping units are in this case also of the second type.

Figure 10:
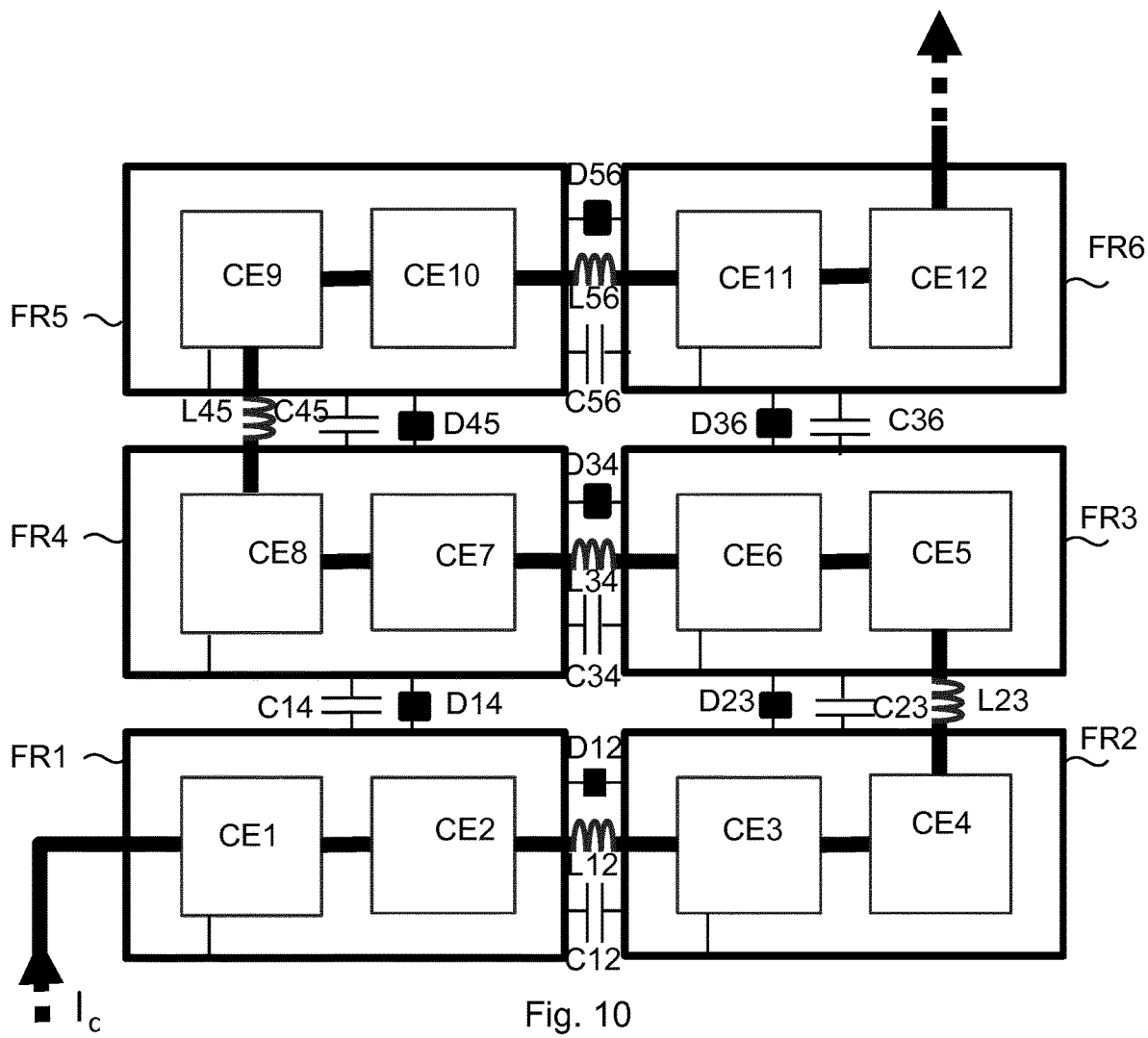
FIG. 10 shows the second type of damping unit connected in the second variation of the second type of converter arrangement.
Figure 11:
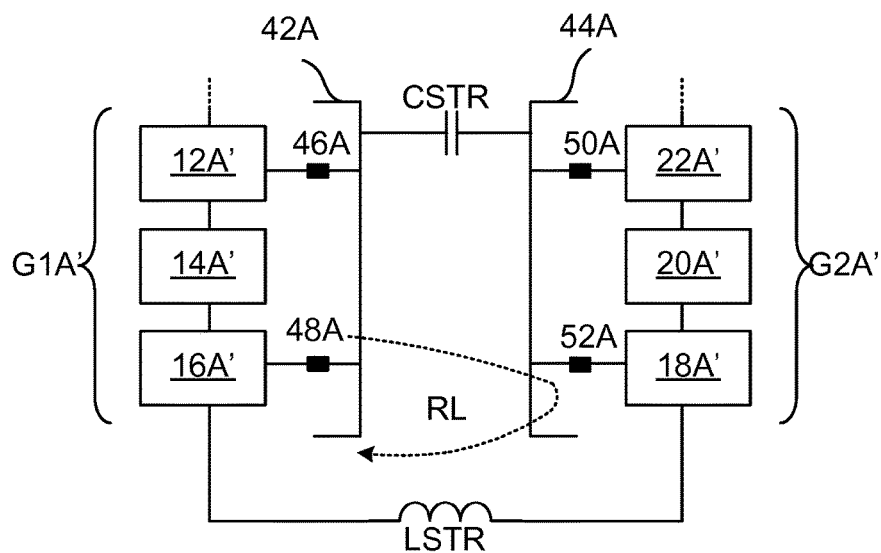
FIG. 11 shows additional screens and damping units connected in the second variation of the first type of converter arrangement having parallel stacks of cells.

As can be seen in FIG. 10, it is in the same way possible to connect damping units of the second type in parallel with the stray capacitances between neighboring frames in the second variation of the second type of converter. There is thus a damping unit D12 connected between the first and second frames FR1 and FR2 in parallel with stray capacitance C12, a damping unit D14 connected between the first and fourth frames FR1 and FR4 in parallel with stray capacitance C14, a damping unit D23 connected between the second and third frames FR2 and FR3 in parallel with stray capacitance C23, a damping unit D34 connected between the third and fourth frames FR3 and FR4 in parallel with stray capacitance C34, a damping unit D36 connected between the third and sixth frames FR3 and FR6 in parallel with stray capacitance C36, a damping unit D45 connected between the fourth and fifth frames FR4 and FR5 in parallel with stray capacitance C45 and a damping unit D56 connected between the fifth and sixth frames FR5 and FR6 in parallel with stray capacitance C56, where all damping units are of the second type.

Figure 12C:
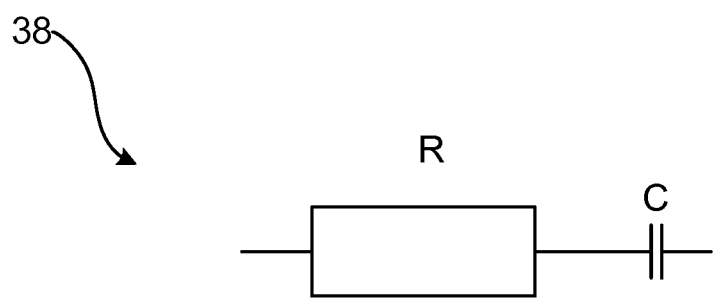
FIG. 12c shows a realization of the second type of damping unit.

In this case the second type of damping unit 38 may be realized as a resistor R in series with a capacitor C as shown in FIG. 12c, in which case the damping unit is in effect a second filter.

The dampening with regard to resonance loops formed between parallel stacks in the first type of converter arrangement can be seen in FIG. 1i. In this case a first, vertically oriented conductive shell 42A is introduced adjacent the first group of cells G1A' comprising cells 12A', 14A' and 16A' in the first stack and a second vertically oriented conductive shell 44A is introduced adjacent the second group of cells G2A' comprising the cells 18A', 20A' and 22A' in the second stack. The conductive shells 42A and 44A are in this case first and second screens, for instance metallic such as made of Copper or Aluminum, that have been introduced in the structure. Thereby each resonance loop stretches from the first module via the first and second screens and the second module back to the first module. In this way a well-defined stray capacitance CSTR is obtained between the two stacks. It is then possible to connect damping units between the cells of a stack and the corresponding conductive shell. This means that a resonance loop that comprises damping units may comprise a first damping unit of the first type between the first module and the first screen and another damping unit of the first type between the second screen and the second module.

As an example, the third and fourth cells 16A' and 18A' are connected with damping units 48A and 52A of the first type, for instance only comprising resistors, to the conductive shells 42A and 44A, respectively, while the first and sixth cells 12A' and 22A' are connected with further damping units 46A and 50A comprising resistors in series with capacitors, to the conductive shells 42A and 44A, respectively. The further damping unit will typically require a capacitor in the connection to the shield in order to avoid bypassing of the first damping unit. It is additionally possible to connect a damping unit of the second type between the two conductive shells. It is also possible to remove the further damping units 46A and 50A.

Figure 13:
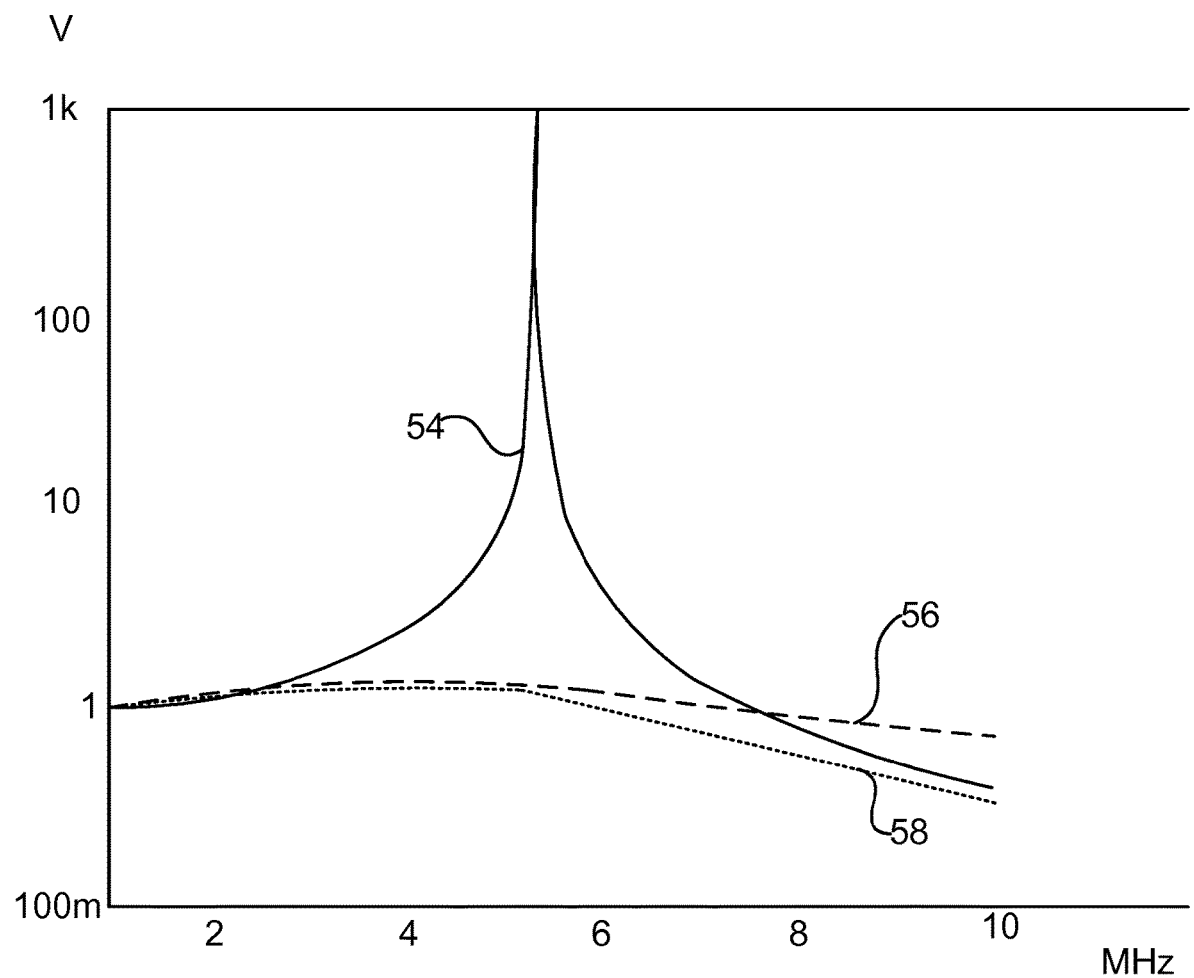
FIG. 13 shows undamped resonances and resonances being damped using the first and second types of damping units.
Figure 14:
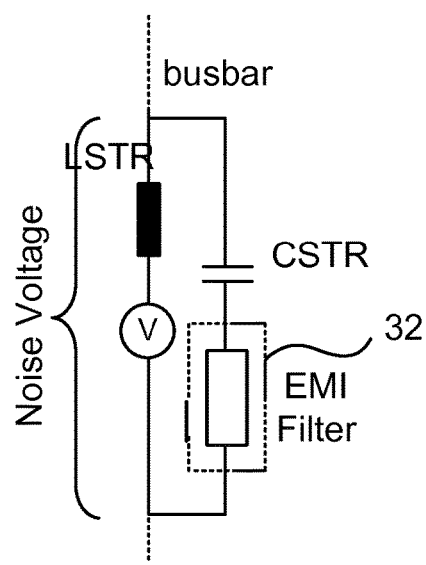
FIG. 14 shows an equivalent EMI reducing circuit with the first type of damping unit.
Figure 15:
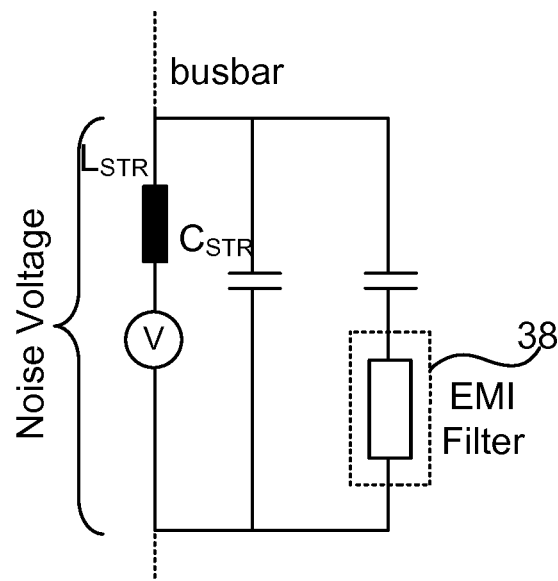
FIG. 15 shows an equivalent EMI reducing circuit with the second type of damping unit.

The principle of the damping can be understood from FIGS. 13, 14 and 15, where FIG. 13 shows an unfiltered noise curve 54, a filtered noise curve 56 using the first filter and a filtered noise curve 58 using the second filter, FIG. 14 shows an equivalent circuit of a noise source, stray capacitances and stray inductances together with the first type of damping unit 32 and FIG. 15 shows the noise source, a stray capacitance and a stray inductance together with the second type of damping unit 38.

Operation of the cells in a phase legs can be seen as providing a noise source V feeding the stray inductance LSTR in series with the stray capacitance CSTR, where a first filter 32 is connected in series with the stray capacitance CSTR in the loop and a second filter 38 is connected in parallel with the stray capacitance CSTR of the loop. It can be seen in FIG. 13 that in both cases a resonance may be significantly reduced and thereby the EMI is also reduced.

As can be seen above a damping unit may be placed in the low-ohmic, metallic connection between cell and screen, where the damping unit can be realized through a single resistor or a parallel-connection of discrete R and L elements (coil and resistor). The value of the resistance may need to be selected so that a sufficient damping effect is achieved, and, at the same time, steady-state potential of the shield is not changed and high frequency transient potential change of the shield or enclosure is not affecting the dielectric design of the station. This is obtained if the resistance is in the range 10-10 kΩ. The inductor if it is present may in turn be in the range 1μ-10 mH.

A capacitor, if it is included, may in turn be in the range 1-100 nF.

It should be realized that it is possible to add further components to the filters such as further inductors and/or capacitors in order to obtain enhanced filtering such as band-pass and band-stop filtering.

As an alternative to the first damping unit it is possible to instead use a core of magnetic material such as iron or a HF magnetic material (ferrite/nanocrystalline or amorphous tape) located on the conductor connecting the Corona shield or PEBB frame with the cell. Such a magnetic core located on the conductor is represented by an equivalent circuit of a parallel connection of L and R, where R represents the losses in the core. Optimum filter design may require more than a single turn of the primary conductor, which increases the effective inductance, but reduces the maximum current, at which the core saturates. The core may additionally comprise a secondary winding, to which a damping resistor is connected. This enables an optimization to be made of the value of the parallel R in the equivalent circuit so that an optimum damping effect is achieved. The function of the secondary winding and the resistor can be achieved by resistive and shorted terminals or by a resistive coating (or potting) on the core.

Figure 16:
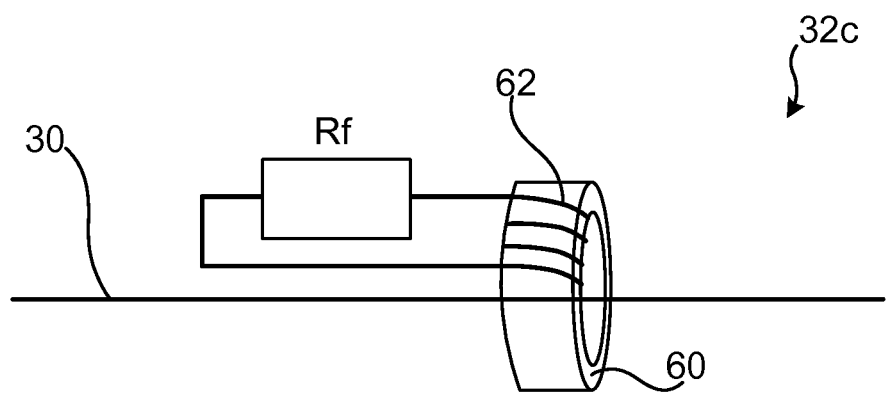
FIG. 16 shows a filter variation that may be used as the first type of damping unit.

FIG. 16 schematically shows such a damping unit 32C with a core 60 around the first connection 30, where in turn a coil 62 is wound around this core 60 and connected to a further resistor Rf.

The core mentioned above may additionally be formed of two halves, i.e. a toroid core cut in half, so that a "clamp on" application is possible. The clamp on application is particularly useful in case, when the conductor over which the filtering RL element is to be placed, cannot or is difficult to open (detach). It is thereby also useful in retrofitting situations.

Above the screens were disclosed as metallic such as Aluminum or Copper screens. It should however be realized that it is possible to implement damping units also by using non-metallic corona shield elements, fabricated from resistive (semiconductive) material (e.g. thermoplastic material comprising conductive filler like carbon black). Another alternative is to use a non-conductive screen made of e.g. a thermoplastic material, with a resistive coating to which the electrical connection is realized. In this case the finite conductivity of the shield material or shield coating introduces the resistive damping into the high frequency current path. This is also possible to use in relation to damping performed for a PEBB frame.

Advantages of the invention may be summarized in the following way:

The high frequency noise of converter substations can significantly be reduced

The damping unit can be compact and lightweight as the damping unit is not placed in the main current path and it does not need to be dimensioned for high current carrying capabilities, such as low joule heating, no magnetic saturation, etc.

Low material cost according to the compact and lightweight damping unit design

The approach can additionally potentially prevent costly EMI design adaptions

Only little mechanical re-design of converters is necessary, damping units can be designed with sufficient margin The approach potentially offers a convenient and cheap solution to satisfy EMI needs after commissioning The proposed approach is an additional technique to control the EM noise of converter substations.

From the foregoing discussion it is evident that the present invention can be varied in a multitude of ways.

It shall consequently be realized that the present invention is only to be limited by the following claims.

The invention claimed is:

1. A converter apparatus comprising:
a string of electrically interconnected modules that includes a first group of modules comprising a first module and a second group of modules comprising a second module;
a first screen connected to a first defined electric potential node and located adjacent the first group of modules;
a second screen connected to a second defined electric potential node and located adjacent the second group of modules, wherein during operation of the converter apparatus a resonance loop is created from the first module via the first and second screens and the second module back to the first module; and
a damping unit in the resonance loop, the damping unit being set to dampen electromagnetic noise.

2. The apparatus according to claim 1, wherein the damping unit is connected between the first and second screens.

3. The apparatus according to claim 2, wherein the damping unit comprises a filtering component in the form of a capacitor.

4. The apparatus according to claim 1, wherein the damping unit is configured to provide band-pass filtering.

5. The apparatus according to claim 1, wherein the damping unit is configured to provide band-stop filtering.

6. The apparatus according to claim 1, wherein the string of modules comprises a first electrically interconnected and horizontally aligned stack placed in parallel with a second electrically interconnected and horizontally aligned stack, where the first group of modules is included in the first stack and the second group of modules is included in the second stack.

7. The apparatus according to claim 1, wherein the converter apparatus is configured to convert between AC and DC and wherein the first and second screens are Corona shields provided for neighboring groups of modules in the string of modules.

8. The apparatus according to claim 1, wherein the converter apparatus further comprises a second string of electrically interconnected modules and a third string of electrically interconnected modules three strings, wherein the string, the second string and the third string are connected between three phases of an AC system, and wherein the first and second screens are enclosures for neighboring first and second groups of modules.

9. A converter apparatus comprising:
a string of electrically interconnected modules that includes a first group of modules comprising a first module and a second group of modules comprising a second module;
a first screen connected to a first defined electric potential node and located adjacent the first group of modules;

a second screen connected to a second defined electric potential node and located adjacent the second group of modules, wherein during operation of the converter apparatus a resonance loop is created from the first module via the first and second screens and the second module back to the first module; and a damping unit in the resonance loop, the damping unit being set to dampen electromagnetic noise, wherein the damping unit is placed between the first defined potential node and the first screen.

10. The apparatus according to claim 9, wherein the damping unit comprises a filtering component in the form of an inductor.

11. The apparatus according to claim 9, wherein the damping unit comprises a core of magnetic material surrounding a connection between the first defined potential node and the first screen.

12. The apparatus according to claim 11, wherein the damping unit comprises a coil wound around the core of magnetic material.

13. The apparatus according to claim 9, wherein the damping unit comprises a resistance.

14. A converter apparatus comprising:
a string of electrically interconnected modules that includes a first group of modules comprising a first module and a second group of modules comprising a second module;
a first screen connected to a first defined electric potential node and located adjacent the first group of modules;
a second screen connected to a second defined electric potential node and located adjacent the second group of modules, wherein during operation of the converter apparatus a resonance loop is created from the first module via the first and second screens and the second module back to the first module; and
a damping unit in the resonance loop, the damping unit being set to dampen electromagnetic noise, wherein the damping unit comprises a resistance.

15. The apparatus according to claim 14, wherein the damping unit further comprises an inductor and wherein the resistance is connected in parallel with the inductor.

16. The apparatus according to claim 15, wherein the damping unit further comprises a further filter component for providing band-pass or band-stop filtering.

17. The apparatus according to claim 14, wherein the damping unit further comprises a capacitor and wherein the resistance is connected in series with the capacitor.

18. The apparatus according to claim 17, wherein the damping unit comprises a further filter component for providing band-pass or band-stop filtering.

19. The apparatus according to claim 14, wherein the resistance is realized as a discrete resistor.

20. The apparatus according to claim 14, wherein the resistance is realized through the first and second screens being semiconductive.

\* \* \* \* \*